United States Patent
Day

(10) Patent No.: US 9,182,278 B2
(45) Date of Patent: Nov. 10, 2015

(54) WIDE SPECTRAL RANGE SPECTROMETER

(71) Applicant: SciAps, Inc., Millis, MA (US)

(72) Inventor: David Day, Boxford, MA (US)

(73) Assignee: SciAps, Inc., Woburn, MA (US)

( * ) Notice: Subject to any disclaimer, the term of this patent is extended or adjusted under 35 U.S.C. 154(b) by 91 days.

(21) Appl. No.: 13/826,102

(22) Filed: Mar. 14, 2013

(65) Prior Publication Data

US 2014/0268127 A1 Sep. 18, 2014

(51) Int. Cl.
- *G01J 3/28* (2006.01)
- *G01J 3/02* (2006.01)
- *G01J 3/14* (2006.01)
- *G01J 3/16* (2006.01)
- *G02B 26/08* (2006.01)

(52) U.S. Cl.
CPC ............... *G01J 3/0229* (2013.01); *G01J 3/021* (2013.01); *G01J 3/0208* (2013.01); *G01J 3/0291* (2013.01); *G01J 3/14* (2013.01); *G01J 3/16* (2013.01); *G02B 26/0833* (2013.01)

(58) Field of Classification Search
CPC ........................................................ G01J 3/28
USPC .................................. 356/328, 330, 310, 326
See application file for complete search history.

(56) References Cited

U.S. PATENT DOCUMENTS

| | | | | |
|---|---|---|---|---|
| 4,049,353 A * | 9/1977 | Missio | ........................... | 356/310 |
| 4,193,691 A * | 3/1980 | Fjarlie | ........................... | 356/330 |
| 4,790,654 A * | 12/1988 | Clarke | ........................... | 356/310 |
| 4,984,888 A | 1/1991 | Tobias | | |
| 5,029,245 A * | 7/1991 | Keranen et al. | ............... | 250/205 |
| 5,504,575 A * | 4/1996 | Stafford | ....................... | 356/330 |
| 5,748,308 A * | 5/1998 | Lindberg et al. | .............. | 356/310 |
| 6,128,078 A * | 10/2000 | Fateley | ........................ | 356/330 |
| 6,459,484 B1 * | 10/2002 | Yokoi | ........................... | 356/318 |
| 6,859,275 B2 * | 2/2005 | Fateley et al. | .................. | 356/330 |
| 6,934,069 B2 | 8/2005 | Moon et al. | | |
| 7,190,451 B2 * | 3/2007 | Seyfried et al. | ............... | 356/326 |
| 7,196,789 B2 | 3/2007 | Senturia et al. | | |
| 7,440,098 B2 * | 10/2008 | Christian et al. | ............. | 356/319 |
| 7,692,784 B2 * | 4/2010 | MacKinnon et al. | .......... | 356/300 |
| 7,719,680 B2 * | 5/2010 | Christian et al. | ............. | 356/319 |
| 8,018,589 B2 * | 9/2011 | MacKinnon et al. | .......... | 356/300 |
| 8,436,630 B2 | 5/2013 | Fong et al. | | |
| 8,553,218 B2 * | 10/2013 | Tinnemans et al. | ......... | 356/237.5 |
| 2005/0213092 A1 * | 9/2005 | MacKinnon et al. | ......... | 356/336 |
| 2008/0174777 A1 * | 7/2008 | Carron | ......................... | 356/328 |
| 2010/0253935 A1 | 10/2010 | MacKinnon et al. | | |
| 2011/0285995 A1 * | 11/2011 | Tkaczyk et al. | .............. | 356/326 |

OTHER PUBLICATIONS

Written Opinion of the International Searching Authority for PCT Application No. PCT/US2014/24486 mailed Aug. 4, 2014 (five (5) pages).

(Continued)

*Primary Examiner* — Roy M Punnoose
(74) *Attorney, Agent, or Firm* — Iandiorio Teska & Coleman, LLP

(57) ABSTRACT

Featured is a spectral analysis method and a wide spectral range spectrometer including a source of electromagnetic radiation and an optical subsystem configured to disperse radiation into a plurality of wavelengths. A pixilated light modulator receives the radiation wavelengths and is configured to direct one or more selective wavelengths to a sample.

23 Claims, 3 Drawing Sheets

(56) References Cited

OTHER PUBLICATIONS

D. Scott Birney et al., "Observational Astronomy", Cambridge University Press, 2006, pp. 228-229 (four (4) pages total).
Communication in Cases for Which no Other Form is Applicable, mailed Jul. 15, 2015, PCT Application No. PCT/US2014/024486, (two (2) pages).
Patent Cooperation Treaty PCT Third Party Observation (PCT Administrative Instructions Part 8), mailed Jul. 15, 2015, PCT Application No. PCT/US2014/024486, (four (4) pages).
Third Party Observations Regarding WO 2014/159626, mailed Jul. 15, 2015 (two (2) pages).
Karlander, Johan, Designing and Building a Pre-Dispersive DMD Spectrometer, Feb. 14, 2011 (forty (40) pages provided with Third Party Observations in PCT Application No. PCT/US2014/024486).
Lina Xu, et al., "Compressive Echelle Spectroscopy", Unconventional Imaging. Wavefront Sensing, and Adaptive Coded Aperture Imaging and Non-Imaging Sensor Systems, © 2011, (thirteen (13) pages provided with Third Party Observations in PCT US/2014/024486).
Fong, Alexandre Y., "Spectral Transmittance and Reflectance Measurements Utilizing a DLP® Based Spectral Source", Emerging Digital Micromirror Device Based Systems and Applications III, © 2011, (nine (9) pages provided with Third Party Observations in PCT US2014/024486).
D. Scott Birney et al., "Observational Astronomy", Cambridge University Press, 2006, pp. 228-229.

\* cited by examiner

WIDE SPECTRAL RANGE SPECTROMETER

FIELD OF THE INVENTION

The invention relates to spectrometers.

BACKGROUND OF THE INVENTION

Spectrometers are widely used in both research and industry for analysis, detection, and confirmation of material composition. In recent years, handheld spectrometers operating in the visible, near infrared, and mid infrared spectral ranges have been prolific and been sold into numerous markets.

Spectrometers are used to analyze materials often in order to determine elemental or molecular composition. The more wavelength resolution and/or spectral bandwidth, i.e. wavelength range that a spectrometer is capable of, the more compositional information can be attained which in turn leads to the ability to analyze more complex materials and mixtures. Another important aspect of small handheld spectrometers is measurement speed. Users are typically able to hold a portable spectrometer up to a sample for seconds and even up to a minute, but much longer than this leads to fatigue and the inability to measure many samples quickly. Yet another important characteristic of portable spectrometers is overall cost. Finally, and perhaps most important for portable spectrometers, is instrument reliability and overall ruggedness for field use.

One common portable spectrometer design employed by Ocean Optics, Stellar Net, Avantes, Thermo Fisher Scientific and multiple other vendors for the deep UV to near infrared wavelength range (200 to 1100 nm) utilizes inexpensive silicon based CCD linear array detectors. The design eliminates the need for the older scanning gratings and basically dedicates each pixel in the linear array detector to a particular small wavelength range. The advantage is no moving parts, small size, ruggedness, and low cost. These spectrometers typically have several thousand pixels and can be designed for a small slice of the UV-VIS-NIR spectrum with high resolution or a larger slice with lower resolution.

Similar spectrometers are also available at longer wavelengths in the Near Infrared (NIR) beyond where silicon detectors function. These spectrometer (offered by the same vendors previously mentioned) typically utilize Indium Gallium Arsenide (InGaAs) detector arrays. While these function well, the disadvantage is that they are extremely expensive in comparison to silicon arrays and depending on desired performance and they usually require cooling. The cooling adds to volume and power consumption making these devices less portable.

An optional NIR portable spectrometer configuration is to use a single small element InGaAs detector in conjunction with a MEMS light modulator. Polychromix successfully introduced such a portable spectrometer in 2006. Similar designs can be found in the literature using Texas Instrument's digital micro-mirrors as well. See also U.S. published application No. 2008/0174777 incorporated herein by this reference.

There is currently not a large selection of portable spectrometers with both a wide spectral range and high resolution on the market. Spectral Evolution and ASD offer reasonably high resolution spectrometers that cover the wide range of roughly 400 to 2500 nm but do so with the added drawbacks of size, weight, and expense. Internally, these units consist of multiple versions of the spectrometers previously described.

An optional design for high resolution wide spectral range spectrometers is the Echelle spectrometer. These spectrometers use a two dimensional detector and a cross dispersing element (such as a prism) in addition to the usual diffraction grating to spread spectrum in two dimensions across both dimensions of the detector. A limiting factor of this type of design remains that the currently available detectors cannot cover the wide range from 400 to 2500 nm. For example, silicon detectors always lose sensitivity above 1100 nm. While it is feasible for certain InGaAs detectors to work over nearly this entire range, the cost is even more prohibitive that that of the linear (1D) InGaAs arrays.

SUMMARY OF THE INVENTION

One advantage of the spectrometer described in this application is high resolution, wide spectral range, low cost, low weight, and high durability/ruggedness.

It would be useful to have a small spectrometer, suitable for handheld operation, that can cover an even wider range than current commercial devices. Currently available wide range spectrometers, such as those from Spectral Evolution or ASDI often contain three separate optical spectrometers to cover the range and thus are larger, heavier, and more expensive than a single spectrometer that could handle the entire range.

A multi-diffraction order grating and digital micro-mirror device (DMD) which serves as a light modulator, can be used in combination to provide ultra-compact spectrometers covering large wavelength ranges. This type of wide range spectrometer, potentially covering UV, visible, and near infrared, can be used for various kinds of material and chemical identification.

Featured is a wide spectral range spectrometer comprising a source of electromagnetic radiation and an optical subsystem configured to disperse said radiation into a plurality of wavelengths. A pixilated light modulator (e.g., a DMD) receives the radiation wavelengths and is configured to direct one or more selective wavelengths to a sample.

In one example, the optical subsystem may include a grating (e.g., an Echelle type grating) oriented to disperse said radiation in one plane and a prism configured to disperse said radiation in another plane. A focusing lens may be located between the prism and the pixilated light modulator. Preferably, the prism may be between the grating and the pixilated light modulator. The prism may be between the grating and pixilated light modulator and also between the source and the grating. The spectrometer may further include a lens between the source and the prism and between the prism and the pixilated light modulator for collimating radiation from the source and focusing radiation from the prism. The lens may be further located between the pixilated light modulator and the sample to focus radiation from the pixilated light monitor onto the sample.

The spectrometer typically also includes at least one detector responsive to radiation from the sample, e.g., an InGaAs and/or a silicon detector. The source may be a visible source, a near infrared source, or a mid-infrared light source. The digital micro mirror device may have individually operable mirrors in a two dimensional array. A controller is configured to selectively actuate different mirrors. The controller can be programmed to control the digital micro mirror device to sequentially direct different wavelengths to the sample and/or the controller can be programmed to control the digital micro mirror device to direct multiple wavelengths to the sample simultaneously.

Also featured is a spectrometer method comprising dispersing radiation from a source into a plurality of wavelengths, directing said wavelengths to a pixilated light modulator, and controlling the pixilated light monitor to direct one or more wavelengths to a sample. Dispersing radiation may include dispersing radiation in one plane and then dispersing said radiation in another plane. The method may further include focusing said wavelengths onto the pixilated light modulator. The method may further include focusing and collimating radiation from the source using a single optic.

Also featured is a method comprising projecting cross dispersed light onto a micro mirror array having a plurality of individual mirrors, activating individual mirrors following a selective sequence of mirror combinations to direct an individual wavelength or individual wavelengths to a sample, detecting a signal reflected by the sample for each mirror combination, and recovering a complete spectrum by recombining data from signals according to the collection sequence in use.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
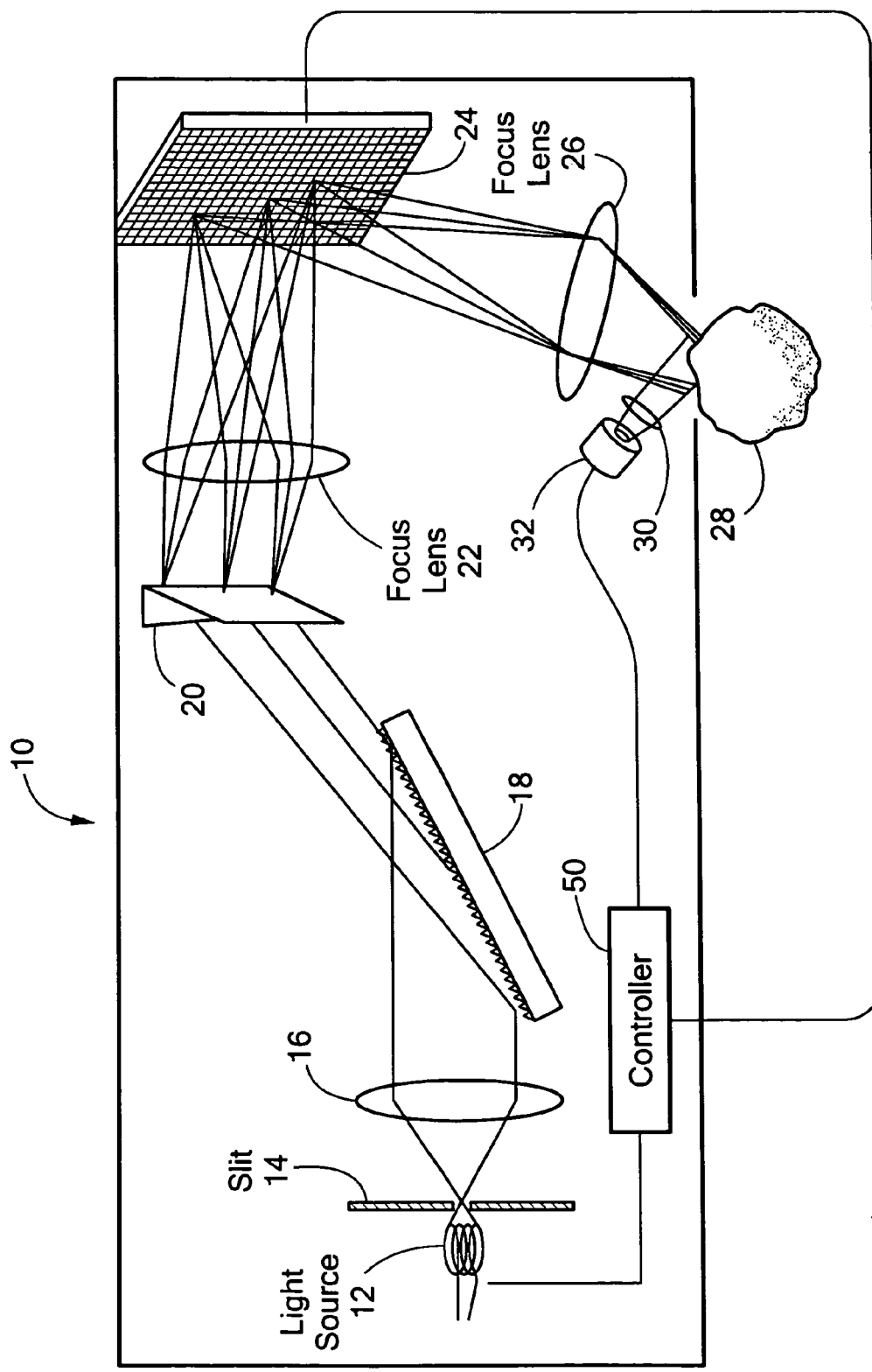
FIG. 1 is a schematic diagram of one embodiment of a wide range spectrometer according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

FIG. 1 shows an example of spectrometer 10 with a pixilated light modulator associated with the source. The spectrometer need not be a complete device and may include only the source section without detection optics and/or components. Electromagnetic radiation from a source filament 12 passes through a slit 14 and through a collimating lens 16. Collimated light is diffracted from a grating 18 that disperses the light as a function of wavelength in the plane of the diagram. The light then passes through a prism 20 which further disperses the light in the out-of-diagram-plane direction. The prism 20 acts as a diffraction order separator. Light from the prism 20 then passes through a focusing lens 22 and onto a micro-electromechanical (MEM) digital micro-mirror device (DMD) array 24. The focusing lens focuses each wavelength to a small separate area on the DMD micromirror array. The DMD has a large number of mirrors (in some cases over 1 million) that can be individually programmed to one of two possible tilt angles. Typically, the Texas Instruments DMDs can be set to the plus 12 degree or −12 degree position. The mirror positions can be electronically modulated by controller 50 at very high speeds enabling wavelengths of light hitting a particular area to be directed to the sample focusing lens 26. Light passing the sample focusing lens 26 is then directed toward the sample 28 of interest (i.e. the material under test). In a complete spectrometer, diffusely scattered light from the sample is then collected by an optional collection lens 30 and directed to the detector 32.

Wavelengths can be selected via the mirrors in a timed sequence, which in turn, are directed toward the sample. In this fashion, a full spectrum can be collected by the single element detector 32 as the mirror sequence is carried out. In addition, multiple wavelengths may be directed simultaneously toward the detector making possible the implementation of digital transform spectroscopy. Once such example is known as the Hadamard Transform including a series of wavelength combinations ("masks") that are measured in sequence. After collecting intensity as a function of the Hadamard mask number, a mathematical transform is applied to yield the final spectrum. The advantage of digital transform methodology is that for a given amount of data collection time the signal to noise ratio can be increased by:

$$\text{Signal to noise improvement} = \text{root}(\text{number of pixels}/2) \quad (1)$$

The net improvement increases significantly when the number of pixels is high. A Hadamard transform using 20,000 pixels (or wavelength zones) would yield a signal to noise improvement of 100 over the more traditional process of measuring one pixel or wavelength zone) at a time.

The grating 18 may be an Echelle type grating which is typically used at high angles of incidence (relative to the surface normal) for which the diffracted light contains many overlapping orders. The overlaps are separated via the prism 20 which is situated so that its dispersion direction is normal to that of the diffraction grating 18.

The grating 18 may also be a traditional grating designed for a lower angle of incidence to the grating surface normal. One example would be a grating designed for efficient first order diffraction of light from 1400 nm to 2800 nm. Such a grating also diffracts shorter wavelengths at exactly the same angles. For this particular grating second order diffraction of wavelengths from 700 to 1400 nm would be superimposed on the 1400 to 2800 nm light. In the same vain, third order diffraction from 350 to 700 nm wavelengths would be superimposed in the same fashion.

A conventional spectrometer would use a high pass optical filter to prevent the shorter wavelengths from the light entering the spectrometer. However, in this invention, the $2^{nd}$ order diffraction (from 700 to 1400 nm) and $3^{rd}$ order diffraction (from 350 to 700 nm) light is separated by the prism 20 so that light hitting, the DMD 24 would actually be separated into three separate spectral lines spread across the surface.

This is similar to the function of a traditional Echelle spectrometer which would place a 2 dimensional CCD at the location of the DMD 20 in FIG. 1.

One advantage of using a DMD associated with the source as taught in this invention is that the light can be modulated before being directed to the sample. This allows for automatic rejection of stray light from the environment. The detector can be used to only detect the amplitude of the modulated signal (that light passing the DMD 24) and ignore constant signals (those from the environment).

As a result of the ability for this configuration to reject constant signals (non-modulated signals), the detector dark current and stray light within the spectrometer are also automatically rejected in addition to environmental stray light. This is very important advantage of this spectrometer design and allows for much more precise measurement and detection of very small sample differences.

Yet a further advantage of this design is that only a single detector element may be required. Currently, two dimensional detectors are only available over certain wavelength ranges. However, a stacked InGaAs—extended InGaAs single element detector has sensitivity over the large range of 400 to 2600 nm and is quite inexpensive. This is a very large wavelength range and is important for certain application areas such as mining and mineral identification, and for fruit and grain analysis. Currently available equipment that covers this range is large, bulky and expensive. The spectrometer disclosed here can be made with a volume approaching that of a cell phone. A silicon detector may also be used alone or in conjunction with an InGaAs detector.

Figure 2:
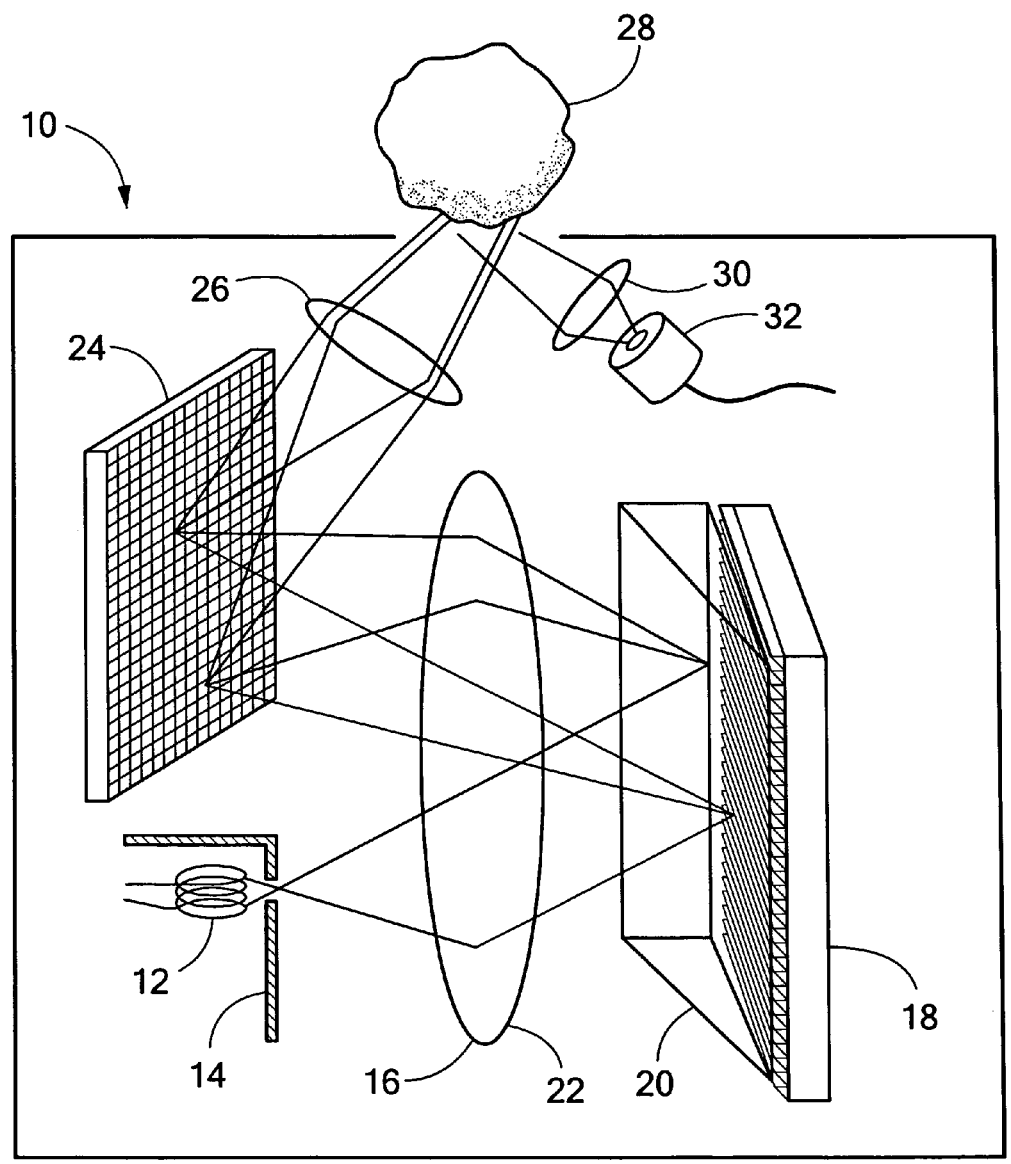
FIG. 2 is a schematic diagram of a second embodiment of this invention modified to a more compact format.

A second embodiment is shown in FIG. 2. In this example, the collimating lens 16 and the focusing lens 22 are combined into one optic. In addition, the prism 20 is placed adjacent to the diffraction grating 18. In this configuration, light passes through the prism twice (before and after reflection off the surface of grating 18) yielding twice the order separating power. Significant space is conserved by this configuration as well.

Figure 3:
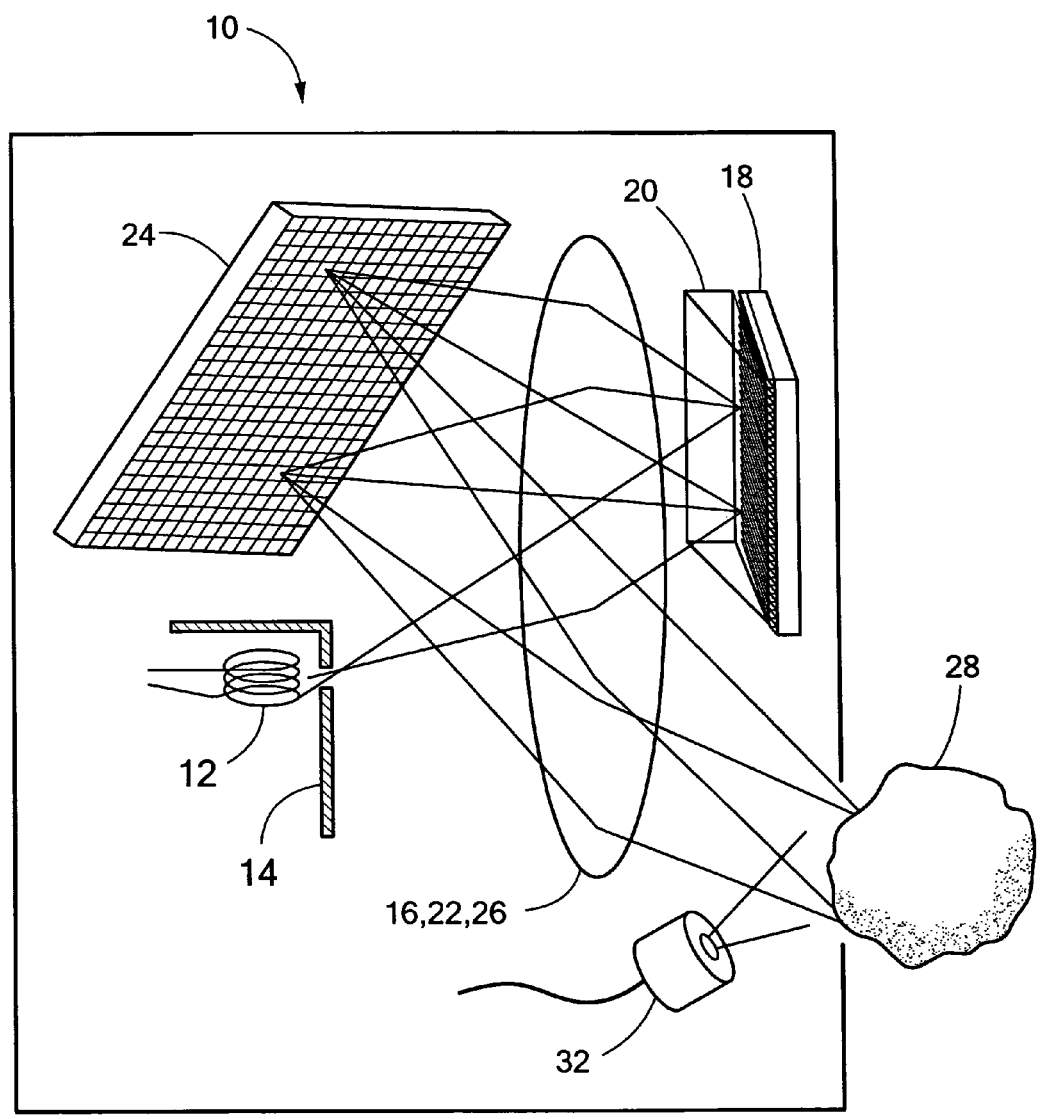
FIG. 3 is a schematic diagram of a third embodiment of this invention showing very compact construction with fewer optical components.

A third embodiment is shown in FIG. 3. In this example, the collimating lens 16, the focusing lens 22, and the sample focusing lens 26 functionalities are all done with a single lens. In addition, the optional collection lens 30 shown in the previous embodiments is omitted to even further simplify the construction. A spectrometer similar to that in FIG. 3 has been constructed and demonstrated with the optics portion consuming a volume of less than 2 cubic inches.

Another advantage of this design over previous designs is that it is difficult to refocus light leaving the DMD to a single point without the use of a second pass off a grating. Such a second pass grating is possible but much more complicated and is inefficient. In previously disclosed designs the collected light from the DMD cannot be well focused onto a detector and therefore use defocused light at the detector which in turn leads to low efficiency. The advantage of this disclosure is that it places the sample at the point of defocus which is ideal for illuminating a large sample area. This effectively combines two points of efficiently loss, the poorly focused light from the DMD and the diffuse nature of the sample, into only one. This makes the overall design more efficient than prior art.

Controller 50, FIG. 1 may control source 12 in addition to DMD 24 and/or may process signals from detector 32 to provide an output to the user regarding the elemental and molecular composition of sample 28. Controller 50 can be programmed to direct specific wavelengths to the sample sequentially (e.g., 500 nm, then 600 nm, then 700 nm, and so on) with the detector output processed between wavelengths. Also, groups of wavelengths can be directed to the sample sequentially. In another example, 500 nm wavelength light is directed to the sample by activating one or more mirrors (e.g., a block or section with 100 mirrors in a 10×10 array) dedicated to the 500 nm wavelength. Other wavelengths are directed elsewhere. The detector output is then processed. Similar measurements are made and processed at each of the other wavelengths. Then, no wavelengths from the source 12 are directed to the sample and the detector output is processed to determine the back ground signal which includes ambient light, sensor dark current, and any internal stray light within the spectrometer. This background signal is subtracted from each of the individual wavelength readings yielding a spectrum uninfluenced by ambient light, detector dark current, and stray light.

For an even more extended wavelength range it is also possible to use more than one detector since several detectors can be mounted next to each other in the configuration described herein. If multiple detectors are used, a separate collection lens may optionally be used with each detector.

The foregoing description and drawings comprise illustrative embodiments of the present invention. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the inventions Although specific features of the invention are shown in some drawings and not in others, this is for convenience only as each feature may be combined with any or all of the other features in accordance with the invention. The words "including", "comprising". "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A enhanced spectral range system comprising:
   a source of electromagnetic radiation;
   an optical subsystem configured to disperse said radiation into a plurality of wavelengths;
   a pixilated light modulator receiving said radiation wavelengths and configured to direct one or more selective wavelengths to a sample;
   a single element detector oriented to receive radiation reflected from the sample, said single element detector sensitive over a wavelength range of approximately 400-2500 nm; and,
   a controller configured to control the pixilated light modulator to direct different wavelengths in sequence to the sample and to process an output of the detector between said wavelengths to yield an extended spectrum.

2. The system of claim 1 in which the optical subsystem includes a grating oriented to disperse said radiation in one plane and a prism configured to disperse said radiation in another plane.

3. The system of claim 2 in which the grating is an Echelle type grating.

4. The system of claim 2 further including a focusing lens between the prism and the pixilated light modulator.

5. The system of claim 2 in which the prism is between the grating and the pixilated light modulator.

6. The system of claim 2 in which the prism is located so electromagnetic radiation passes through the prism before and after reflection from the grating.

7. The system of claim 6 further including a lens between the source and the prism and between the prism and the pixilated light modulator for collimating radiation from the source and focusing radiation from the prism.

8. The system of claim 7 in which said lens is further located between the pixilated light modulator and the sample to focus radiation from the pixilated light monitor onto the sample.

9. The system of claim 1 in which the detector includes an InGaAs and/or a silicon detector.

10. The system of claim 1 in which the source is a visible light source, a near infrared light source, or a mid-infrared light source.

11. The system of claim 1 in which the pixilated light modulator is a digital micro-mirror device with individually operable mirrors in a two dimensional array.

12. The system of claim 1 in which the controller is programmed to control the digital micro-mirror device to direct multiple wavelengths to the sample simultaneously.

13. A method comprising:
dispersing radiation from a source into a plurality of wavelengths;
directing said wavelengths to a pixilated light modulator;
controlling the pixilated light modulator to direct different wavelengths in sequence on to a sample;
detecting said one or more wavelengths using a single element detector sensitive over a wavelength range of approximately 400-2500 nm; and,
processing an output of the detector between said wavelengths to yield an extended spectrum.

14. The method of claim 13 in which dispersing said radiation includes dispersing radiation in one plane and then directing said dispersed radiation in another plane.

15. The method of claim 13 further including focusing said wavelengths onto the pixilated light modulator.

16. The method of claim 13 further including collimating said radiation from the light source and focusing said wavelengths onto the pixilated light modulator using a single optical component.

17. The method of claim 13 in which dispersing radiation includes dispersing visible, a near infrared, or a mid-infrared light.

18. The method of claim 13 further including controlling the pixilated light modulator to direct multiple wavelengths to the sample simultaneously.

19. A method comprising:
projecting cross-dispersed light onto a micro-mirror array having a plurality of individual mirrors;
activating individual mirrors following a selective sequence of mirror combinations to direct an individual wavelength or individual wavelengths to a sample in sequence;
detecting a signal reflected by the sample of each mirror combination using a single element detector sensitive over a wavelength range of approximately 400-2500 nm; and,
processing an output of the detector between said wavelengths; and recovering a complete spectrum by recombining data from signals according to the collection sequence in use.

20. An enhanced spectral range system comprising:
a source of electromagnetic radiation;
a pixilated light modulator configured to direct one or more selected wavelengths to a sample;
a grating between the source and the pixilated light modulator that disperses radiation in one plane;
a prism between the source and the pixilated light modulator that directs said dispersed radiation in a different plane; and,
a single optical element between the source and the prism that collimates radiation from the source, and between the prism and the pixilated light modulator that focuses radiation from the prism onto the pixilated light modulator.

21. A method comprising:
wavelength-dispersing radiation from a source in one plane and directing said dispersed radiation in another different plane onto a pixilated light modulator;
collimating radiation from the source, and focusing said dispersed radiation onto the pixilated light modulator using a single optical element; and,
controlling the pixilated light modulator to direct one or more wavelengths onto a sample.

22. A enhanced spectral range system comprising:
a source of electromagnetic radiation;
a lens configured to collimate said radiation;
an optical subsystem including a grating and a prism, said grating configured to disperse said collimated radiation into a plurality of wavelengths in one plane and said prism to redirect said dispersed wavelengths in a different plane, the prism located so that radiation passes through the prism before and after reflection from the grating;
a pixilated light modulator receiving said dispersed radiation wavelengths and configured to direct one or more selective wavelengths on to a sample;
said lens positioned and configured to focus radiation from the prism onto the pixilated light modulation; and,
a single element detector oriented to receive radiation reflected from the sample.

23. The system of claim 22 in which said lens is further located between the pixilated light modulator and the sample to focus radiation from the pixilated light monitor onto the sample.

* * * * *